United States Patent [19]

Cairns

[11] 4,320,891
[45] Mar. 23, 1982

[54] NIPPLE OPERATED ANIMAL WATERING VALVE

[75] Inventor: Gerald J. W. Cairns, Wyee, Australia

[73] Assignee: Howard Ingram Cairns, Wyee, Australia; a part interest

[21] Appl. No.: 142,301

[22] Filed: Apr. 21, 1980

[51] Int. Cl.³ .............................................. F16K 1/00
[52] U.S. Cl. ................................... 251/332; 251/339; 119/72.5; 137/244
[58] Field of Search ............... 251/339, 332; 119/72.5; 137/244

[56] References Cited

U.S. PATENT DOCUMENTS

| | | | |
|---|---|---|---|
| 2,524,951 | 10/1950 | Ashton | 251/332 X |
| 2,594,968 | 4/1952 | Miller | 119/72.5 |
| 3,646,955 | 3/1972 | Olde | 251/339 X |
| 3,698,431 | 10/1972 | Thompson | 261/71 |

FOREIGN PATENT DOCUMENTS 571192 12/1957 Italy ................................. 251/339

Primary Examiner—Arnold Rosenthal
Attorney, Agent, or Firm—Ladas & Parry

[57] ABSTRACT

A nipple operated animal liquid valve having a valve body defining a passage through which liquid passes to be dispensed by the valve, and a passage closure selectively operable to close the passage, the closure having a nipple which may be operated by an animal to operate the valve.

4 Claims, 4 Drawing Figures

NIPPLE OPERATED ANIMAL WATERING VALVE

The present invention relates to liquid valves and more particularly but not exclusively to animal watering valves.

Conventional animal watering valves presently used have several disadvantages. Firstly the majority are not easily operated by an animal, secondly the animal has little or no control of the flow rate through the valve, thirdly they tend to be complex in their structure and assembly and accordingly are costly, fourthly they require constant maintenance as they are easily blocked or jammed open, and lastly they are not designed individually to cope with a large variation in water pressure. That is to say, several ducts are required to cover a wide range in pressures.

It is the object of the present invention to overcome or substantially ameliorate the above disadvantages.

There is disclosed herein a nipple operated liquid valve comprising a body, a passage extending through the body which is adapted at one end to be attached to a supply of water under pressure, said passage having a valve seat intermediate the end of the passage, a movable valve member to co-operate with the seat and biased to close the passage under the influence of the water pressure, and a nipple attached to said member and projecting outwardly from said passage to enable manipulation of the nipple to move said valve from a seated position to allow liquid to pass through the valve.

A preferred form of the present invention will now be described by way of example with reference to the accompanying drawings wherein.

Figure 1:
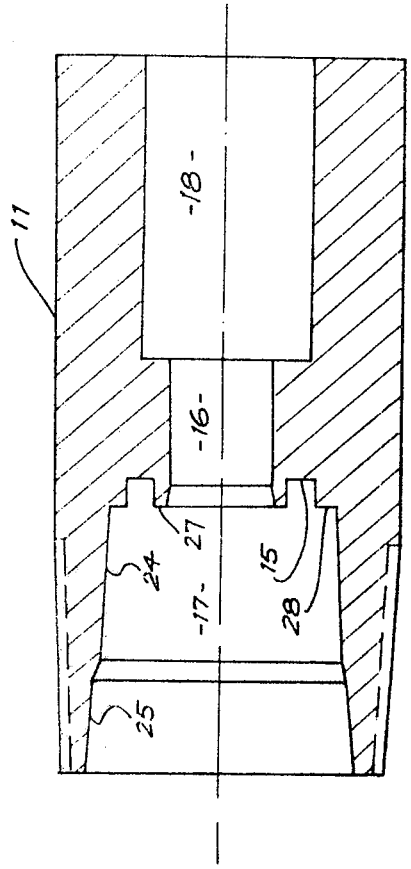
FIG. 1 is a sectioned view of the body portion of an animal watering valve.
Figure 2:
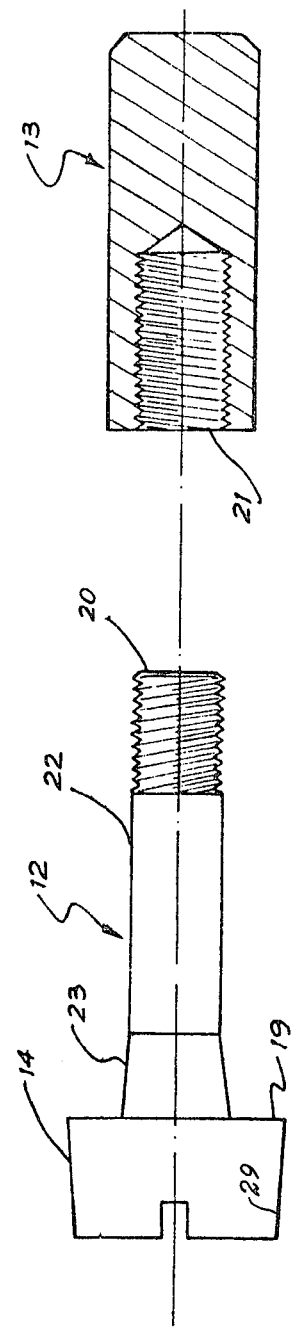
FIG. 2 is a plunger to be used in conjunction with the body of FIG. 1.
Figure 3:
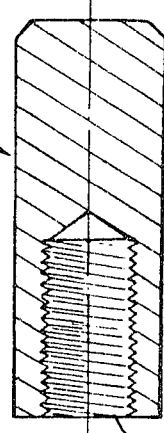
FIG. 3 is a nipple to be attached to the end of the plunger of FIG. 2.

The animal watering valve 10 comprises a body 11 having passages 16, 17 and 18 to receive the plunger 12. The passage or bore 17 has two tapering wall portions 24 and 25 and a groove 15 shaped to receive an 'O' ring seal 26. The plunger 12 has a shank portion 22 with a threaded end 20 and a tapering part 23 leading to the closure part 14. The closure part 14 has a frusto-conical wall portion 29 which is co-extensive with the frusto-conical portion 24 of the passage 17. Additionally, the plunger 12 has an abutment surface 19 to contact O-ring 26. The nipple 13 has a threaded recess 21 to engage threaded end 20 of the shank 22.

Figure 4:
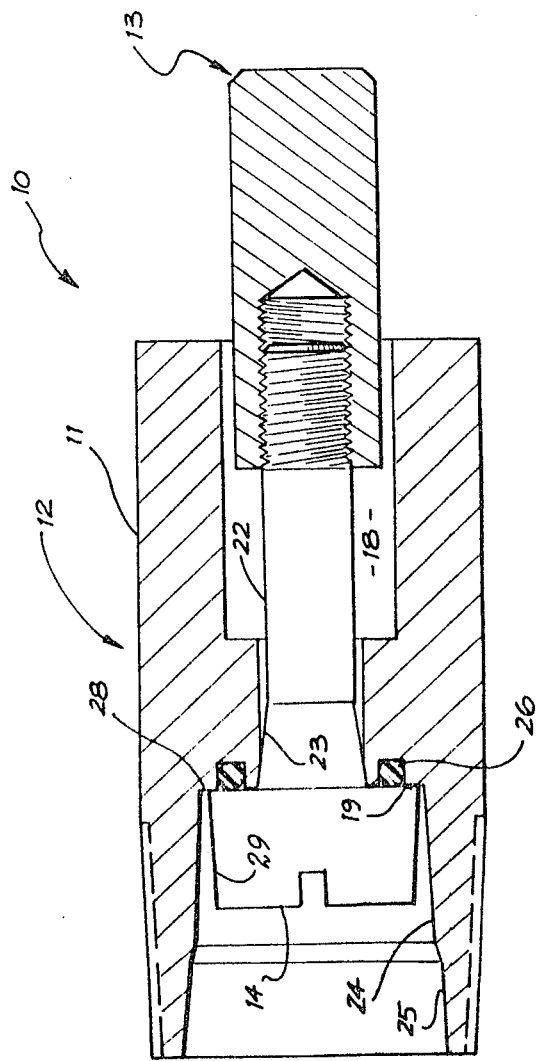
FIG. 4 is an assembled view of the parts of FIGS. 1 to 3 to form an animal watering valve.

The closure part 14, part 23 and shank 22 are adapted to interact with the frusto-conical portions 24 and 25 to move the plunger 12 to a seated position, as depicted in FIG. 4. This is achieved by resisting the flow of water past the plunger 12 to thus establish a pressure difference along the length of the plunger 12 thus biasing the plunger 12 to a seated position. A interaction between the frusto-conical wall portion 29 and the frusto-conical bore portion 24 serves the additional purpose of preventing jamming of the valve member by scale or other particulate matter. This permits the valve member to be oscillated to break up such obstructions and allow them to be flushed clear. This interaction is an inherent part of the operation of the device such that in normal operation by the animals the majority of blockages will be cleared by the animals themselves. This results in a high degree of reliability and savings in service time.

The interaction between closure part 14 particularly the tapered frusto-conical wall portion 29, and the stepped tapered frusto-conical bore portion 24 in the seated position allows a low effort requirement to break the seal and allow water to pass. This provides the device with very wide pressure tolerance. A result of this feature is the fact for example one preferred form is capable of being satisfactorily operated by all ages of pigs from birth to fully grown boars with the valve operating at pressures up to and beyond 60 lbs/sq. inch. This results in considerable savings in capital costs and service labour. During operation the nipple 13 is manipulated by an animal and moved from the position depicted to allow water to pass through the body 11. Once released the water passing between the plunger 12, more particularly the closure part 14, and the wall portions 24 and 25 drag the plunger 12 to a seated position.

The shape and configuration of the passage 18, the plunger 12 and nipple 13 may be adapted to suit different animals. Additionally the solid nipple and the circumferential orifice formed between the nipple and the passage 18 refer to FIG. 4, provide an orifice which is constantly flushed with clean water when operated thus avoiding stagnant zones where food particles may lodge and pathogenic organisms may prolife-rate.

To prevent excessive pressure being applied to the O-ring 26 there is provided annular surfaces 27 and 28 which abut the surface 19 of the plunger 12 to limit movement thereof.

It should also be appreciated that the flow through the valve 10 may be regulated by two movements of plunger 12. The first movement being a tilting thereof from a position of being coaxial with the passage 16, while the second is axial movement away from the O-ring 26.

It has been found advantageous to employ groove 15 of a "V-shaped" cross-section as opposed to the rectangular cross-section depicted with the "V-shaped" groove aid in retaining the "O-ring" 26 in position.

To aid in closing the valve 10 a spring could be provided behind the nipple 13 to press against the inner end face of the nipple 13 and against the end of passage 18.

What I claim is:

1. A nipple operated animal watering valve comprising a body, a passage extending through the body which is adapted at one end to be attached to a supply of water under pressure, said passage having a valve seat intermediate the ends of the passage, a movable valve member to co-operate with the seat and biased to close the passage under the influence of the water pressure, a nipple attached to said member and projecting outwardly from said passage via the other end to enable manipulation of the nipple to move said valve from a seated position to allow liquid to pass through the valve and wherein said passage has a fruston-conical portion which converges in the direction of normal flow through the valve and toward said seat, and said valve member has a frusto-conical side wall portion co-extensive with the passage portion, which side wall portion diverges toward said seat and co-operates with the passage portion to clear the valve of particle matter which may enter the valve.

2. The valve of claim 1 wherein said seat includes an annular groove co-axial with said passage, and said valve further includes an O-ring positioned in said groove, said O-ring and valve member being adapted to sealingly engage to close said passage.

3. The valve of claim 2 wherein an annular abutment is located adjacent said O-ring, which abutment is adapted to engage said member to limit movement thereof in the direction of normal flow through said valve so as to also limit the force applied to said O-ring by said member.

4. The valve of claim 1, 2 or 3 wherein said valve member has a further side wall portion which converges in the normal direction of flow through the valve and which extends downstream from adjacent said seat.

* * * * *